United States Patent [19]
Lattin et al.

[11] B 3,982,129
[45] Sept. 21, 1976

[54] METHOD AND MEANS OF MONITORING THE EFFLUENT FROM NUCLEAR FACILITIES

[75] Inventors: Kenneth R. Lattin; Gerald L. Erickson, both of Richland, Wash.

[73] Assignee: The United States of America as represented by the United States Energy Research and Development Administration, Washington, D.C.

[22] Filed: Nov. 22, 1974

[21] Appl. No.: 526,190

[44] Published under the second Trial Voluntary Protest Program on February 17, 1976 as document No. B 526,190.

[52] U.S. Cl. ............................. 250/364; 250/303; 250/304
[51] Int. Cl.² .......................................... G01T 1/20
[58] Field of Search ........... 250/304, 303, 328, 336, 250/364, 380, 432, 438

[56] References Cited
UNITED STATES PATENTS

| | | | |
|---|---|---|---|
| 3,185,845 | 5/1965 | Lively et al. | 250/304 |
| 3,590,247 | 6/1971 | Holford | 250/304 |
| 3,864,574 | 2/1975 | Wilhelm et al. | 250/364 |

*Primary Examiner*—Archie R. Borchelt
*Attorney, Agent, or Firm*—Dean E. Carlson; Arthur A. Churm; Donald P. Reynolds

[57] ABSTRACT

Radioactive iodine is detected in the effluent cooling gas from a nuclear reactor or nuclear facility by passing the effluent gas through a continuously moving adsorbent filter material which is then purged of noble gases and conveyed continuously to a detector of radioactivity. The purging operation has little or no effect upon the concentration of radioactive iodine which is adsorbed on the filter material.

8 Claims, 2 Drawing Figures

METHOD AND MEANS OF MONITORING THE EFFLUENT FROM NUCLEAR FACILITIES

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

The operation of a nuclear reactor or nuclear facility results in the creation of various radioactive elements. An important requirement of safe operation of a nuclear reactor is proper control of these elements. The control of radioactive isotopes present in the effluent gas stream from a nuclear reactor is normally accomplished by first filtering the effluent cooling gas to remove particulate materials. This leaves as the major radioactive elements of concern radioiodine and gaseous compounds thereof and radioactive noble gases. In normal operation, the quantities of either radioactive iodine or radioactive noble gases in the cooling effluent are maintained at a level low enough to present no hazard to the public health. It is possible that malfunctions in the operation of a nuclear facility may result in temporary generation of increased quantities of radioactive elements in the effluent cooling gas. It is therefore necessary to monitor the concentrations of radioactive materials in the cooling effluent. Radioactive iodine, in particular, is taken up preferentially by the human thyroid and is therefore capable of being concentrated in the body. For this reason, it is particularly important to monitor the effluent level of radioactive iodine.

It is customary to place an adsorbent filter of a material such as activated charcoal in the effluent gas from a reactor or other nuclear facility to remove radioactive iodine from the effluent gas. The filtered effluent is then monitored routinely to provide an assurance of proper operation and to provide an alert to any developing discharge of radioactive iodine resulting from failures in operation such as rupture of a fuel rod or failures in the filtering system that is designed to remove radioactive iodine from the effluent gas stream. Such monitoring efforts have involved the placement of an adsorbent filter in the effluent gas stream or in a stream sampled from the effluent gas. One means of monitoring used in the past comprised placing a detector of radiation in a position to respond to the radiation count from iodine trapped in the adsorbent filter. Another means of monitoring was disclosed in U.S. Pat. No. 3,731,100, incorporated herein by reference, in which the concentration of a radioactive substance was measured by counting total radiation in the effluent, filtering out the radioactive substance to be measured, counting total radiation in the filtered effluent, and combining the results to determine the amount of material adsorbed by filtering. The method disclosed in this U.S. Patent overcomes some disadvantages of the prior art, namely, that a high release rate of radioactive iodine followed by a low release rate gave misleadingly high readings until the residual radioactive iodine decayed to a value lower than that being deposited by the current release rate.

A remaining problem in monitoring for the presence of radioactive iodine is the fact that the effluent gas stream in a properly functioning nuclear facility has already been passed through an adsorbent filter to remove radioactive iodine. The result is the presence of a relatively small concentration of radioactive iodine in the presence of a relatively large concentration of radioactive noble gases. A typical concentration ratio of noble gas to iodine is 10,000–100,000. This has a tendency to mask variations in the concentration of radioactive iodine.

It is an object of the present invention to provide a better method and means of monitoring the concentration of radioactive iodine in the effluent gas stream from a nuclear reactor or other nuclear facility.

It is another object of the present invention to provide a method and means of detecting the concentration of radioactive iodine in the effluent stream from a nuclear facility in the presence of rapid changes of the concentration of radioactive iodine.

It is another object of the present invention to provide a method and means of detecting relatively small quantities of radioactive iodine in a stream of gas also containing radioactive noble gases.

Other objects will become apparent in the course of a detailed description of the invention.

SUMMARY OF THE INVENTION

The present invention is a monitor of the concentration of adsorbable radioactive materials in a fluid stream. A sample that may contain both adsorbable and nonadsorbable radioactive gases is passed through an adsorbent filter. The adsorbent material of the filter is then conveyed to a purging region in which a purging gas removes the nonadsorbed materials from the filter material, leaving only adsorbed materials. The filter material is next conveyed to a detector of radioactivity which thus responds only to the concentration of adsorbable radioactive gaseous material. This invention is particularly adapted to detect the presence of radioactive iodine in a stream containing relatively larger concentrations of radioactive noble gases. It is also adapted to respond to rapid changes in the concentration of radioactive iodine.

DETAILED DESCRIPTION OF THE INVENTION

Figure 1:
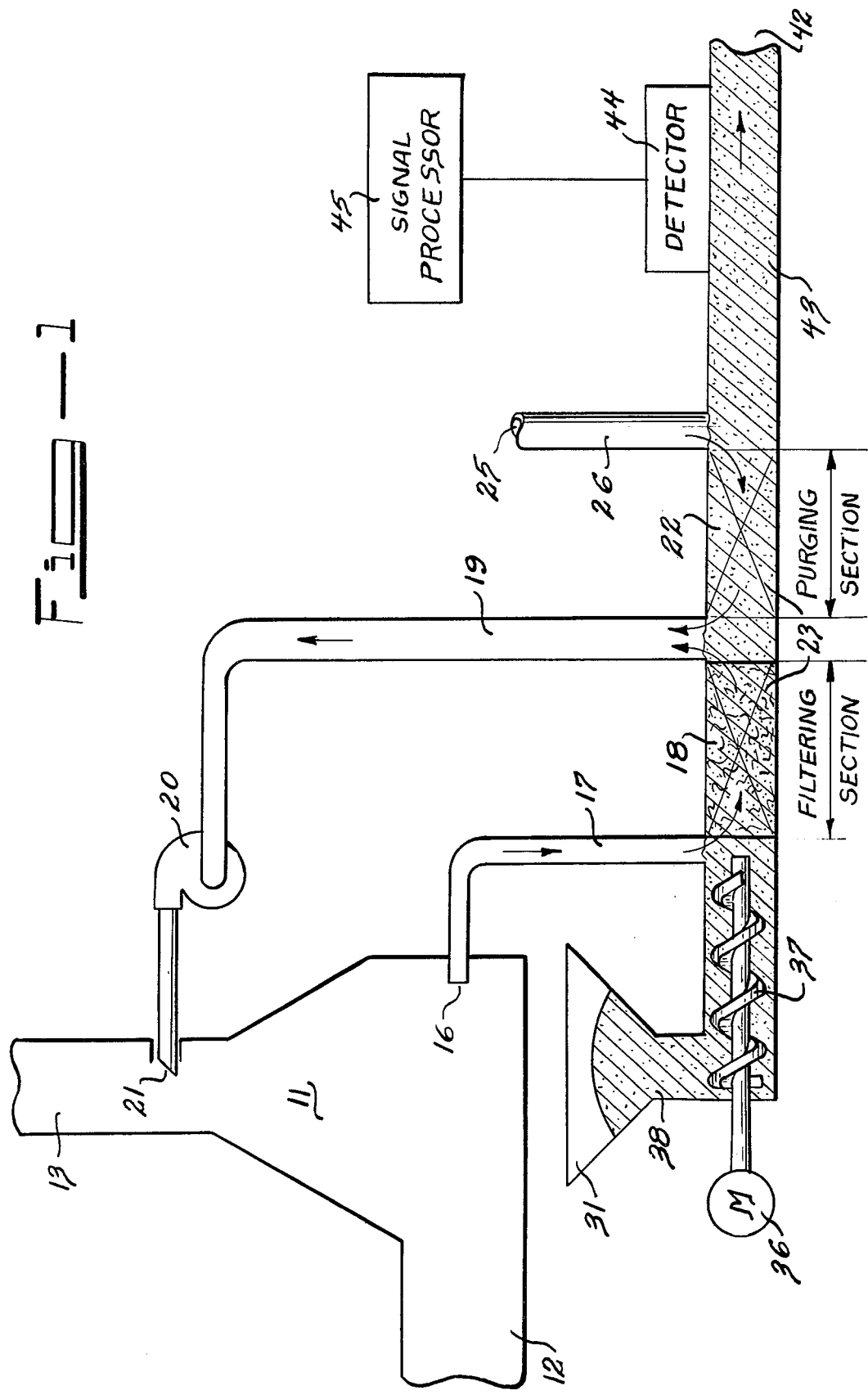
FIG. 1 is a block diagram of an apparatus for the practice of the present invention.

FIG. 1 is a functional diagram of an apparatus for the practice of the present invention. In FIG. 1, stack 11 is part of a conventional system for exhausting gases that have been used to cool portions of a nuclear reactor or nuclear facility. Such gases pass through stack 11 from entry 12 to exit 13. Before their delivery to entry 12, the gases have been subjected to filtering processes to remove both particulate matter and adsorbable gases. In the course of normal operations, the gaseous materials in stack 11 will be sufficiently free of radioactive materials to present no biological threat. The instant invention serves as a monitor to provide an alarm in case of abnormal operations and to provide a continuous record of the level of radioactivity in gaseous emissions.

Sampler 16 is connected to stack 11 to draw a sample of the gases passing therethrough. Sampled gases are conducted through sampled gas inlet 17 and enter a filter section 18 which contains an adsorbent filter material 23 such as activated charcoal, preferably in granular or powdered form. The form of adsorbent filter material 23 is immaterial; for example, solid blocks could be used. After passing through filter section 18, the filtered gases enter return tube 19. Blower 20 pulls a sufficient vacuum in return tube 19 to cause a continued flow of gases in return tube 19 through blower 20 and back into stack 11 at discharge outlet 21. The result is to maintain a continual circulation of sampled gases from stack 11 through filter section 18. It has previously been stated that the gases entering stack 11 at entry 12 were subjected to particulate filtering and adsorbent filtering. It is therefore to be expected that in normal operation the gases in stack 11 will contain moderate amounts of radioactive noble gases and trace amounts of radioactive iodine. The results of the process of filtering described thus far leave two types of radioactive compounds in filter section 18. One is adsorbed radioactive iodine and compounds thereof. The other is residual radioactive noble gases which are not adsorbed but which remain in the voids of the filtering section. To monitor the radioactive iodine, it is desirable to remove the radioactive noble gases from the filter. This is accomplished by mechanically moving the adsorbent filter material 23 in filter section 18 into a purging section 22. A purging gas 25, preferably clean air, is admitted into a purging gas inlet 26 from whence the purging gas passes through purging section 22 and is conducted through return tube 19 and blower 20 to stack 11 at discharge outlet 21. Any adsorbent filter material in purging section 22 will retain adsorbed materials but will be purged of remanent radioactive noble gases by the flow therethrough of purging gas 25.

The motion of granular or powdered adsorbent filter material 23 through filter section 18 and purging section 22 is effected by filling a hopper 31 with adsorbent filter material 23. A motor 36 drives a worm 37, causing adsorbent filter material 23 to proceed through opening 38, thence, subject to the drive of worm 37, to and through a filter section 18, purging section 22 and beyond to an exit 42. From this point the used filter material 23 may be stored, discarded, or accumulated for return to hopper 31 for reuse. Before leaving exit 42, however, filter material 23 is conveyed through a detecting section 43. This passes the adsorbent filter material 23 within measuring range of a conventional detector 44 of radiation. Detector 44 is selected, sized and operated to measure the quantity of emission of radioactive responses from the filter material 23 that is conveyed past it through detecting section 43. Signals received by detector 44 are counted and displayed in signal processor 45 to provide a measure of the quantity of radioactive iodine that has been adsorbed in the filter material 23 that is conveyed through filter section 18. In this manner, a continuous measure is obtained of the concentration of radioactive iodine in the effluent cooling gases in stack 11.

Figure 2:
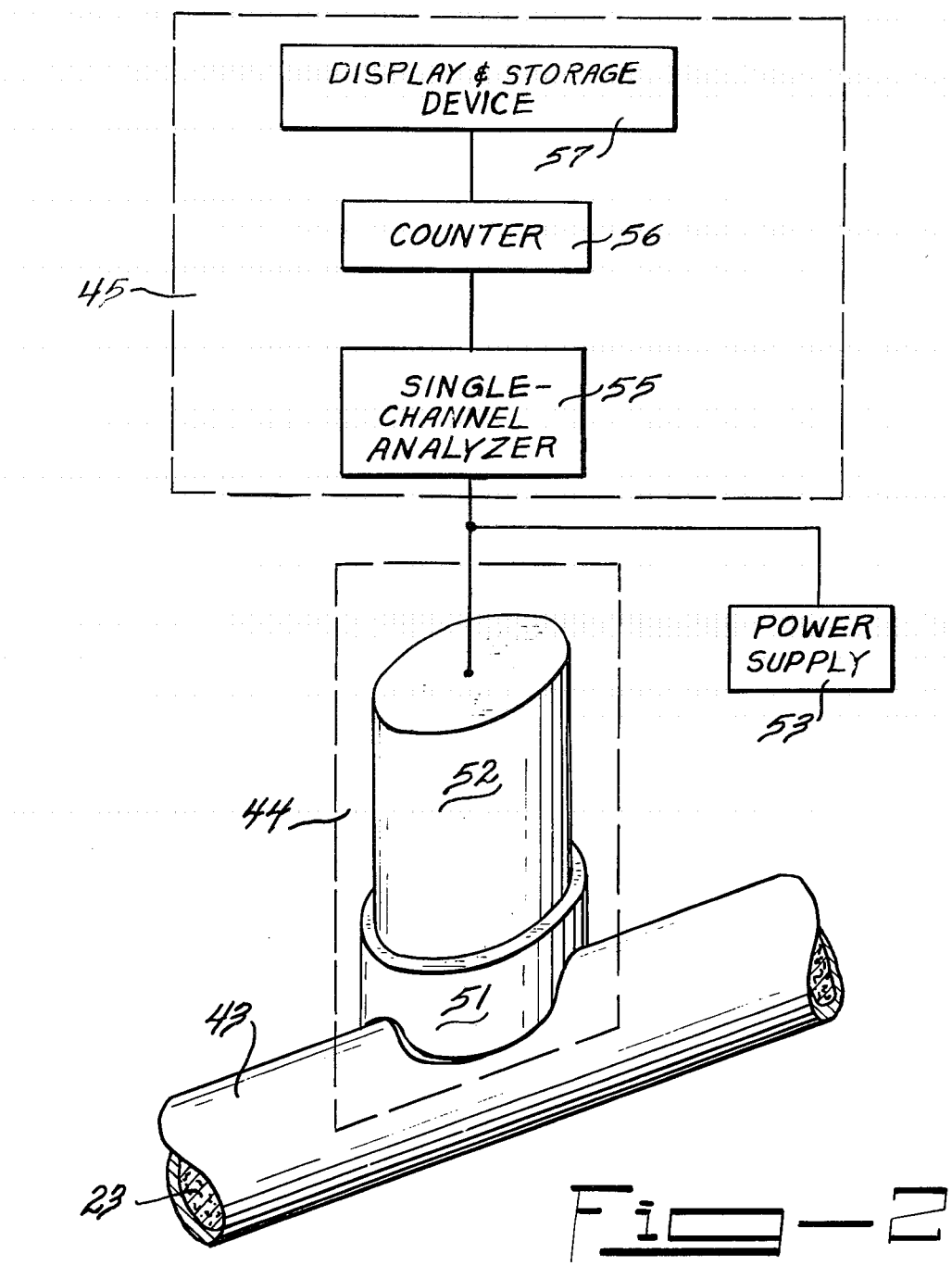
FIG. 2 is an electrical functional block diagram of the detector and signal processor of FIG. 1.

Further details of the measuring process are shown in FIG. 2, which is an expanded partial block diagram of the detecting section, detector, and signal processor of FIG. 1. In FIG. 2, detecting section 43 carries adsorbent filter material 23 past scintillating crystal 51, a conventional detector of radioactivity fashioned of a material such as sodium iodide. Scintillations produced in crystal 51 in response to the presence of radioactive materials in detecting section 43 are converted to electrical signals by photomultiplier 52 and are measured in signal processor 45, which comprises a single-channel analyzer 55 that is connected electrically to photomultiplier 52. Power supply 53 supplies necessary operating voltages to photomultiplier 52. Single-channel analyzer 55 produces electrical signals in response to radiation at a predetermined energy detected in crystal 51. These electrical signals occur at a rate which is proportional to the number of events occurring in the selected energy range. Signals generated in single-channel analyzer 55 are counted in counter 56 and are stored and displayed in display and storage device 57, an oscilloscope, a chart recorder, or the like. The continuous passage of adsorbent filter material 23 through detecting section 43 makes it possible to obtain a continuing record of observed quantities of radioactive iodine as a function of time on display and storage device 57. Display and storage device 57 is thus capable of providing information sufficient to operate an alarm in the case of an unacceptably high emission of radioactive iodine. It is also capable of providing a continuing record of past and current concentrations of radioactive iodine in stack 11.

It should be understood that the detector and signal processor shown in FIG. 2 comprise only one of the many ways that radiation from adsorbed radioactive iodine can be detected, counted, and displayed. Other well-known detection systems could equally as well be used to provide a measure of detected radiation.

An added benefit resulting from the use of a moving filter medium as described above resides in the ability of this apparatus to provide accurate results when a period of relatively high emission of radioactivity is followed by a period of lower emission. The isotope that causes most concern in the emissions from nuclear reactors is $^{131}$I, an artificial radioactive isotope having a half-life of the order of 8 days. A detector that is placed so as to respond to the radioactive iodine trapped by a stationary filter will produce misleading readings when a high rate of emission of radioactive materials is followed by a low rate of emission. When this happens, the correct rate of emission at a particular time when the rate of emission is low may be masked as the previously determined high rate decays exponentially toward zero. The present invention avoids this problem by insuring that the filter material that has adsorbed the relatively high concentration of radioactive iodine or iodine compounds is moved physically past the detector as a result of being conveyed by the worm drive. Thus, the reading obtained by the detector at any time is an accurate measure of the concentration of adsorbed compounds of radioactive iodine trapped in the filtering section at a time past equal to the length of time necessary to convey filter material from the filtering section to the detector. The necessary speed for the worm drive is therefore set at a minimum by the time delay permissible for effective operation. The maximum speed of the worm drive is limited only by the necessity of removing, storing and recirculating particulate filter material that has passed through the entire device. The storage time must be sufficiently long to permit the radioactive I to decay to a level sufficiently low to have no detectable effect upon later measurements when the filter material is recirculated. Normally, two or three half-lives (16 to 24 days) will suffice.

The embodiments of the invention in which an exclusive property or privilege is claimed are defined as follows:

1. A method of measuring quantities of adsorbable radioactive materials on a continuous basis in a stream of gas containing nonadsorbable radioactive materials comprising in sequence the steps of:
   a. passing the stream of gas through an adsorbent filter;
   b. conveying the adsorbent filter through a filter section while passing the stream of gas through the adsorbent filter;
   c. conveying the adsorbent filter through a purging section while passing a purging gas through the adsorbent filter;
   d. conveying the adsorbent filter to a detecting section; and
   e. measuring in the detecting section the radiation emitted by radioactive materials remaining on the adsorbent filter.

2. The method of claim 1 wherein said adsorbent filter comprises a granular filtering material.

3. The method of claim 2 wherein said granular filtering material is granular activated charcoal.

4. A method of measuring the quantity of radioactive iodine in a stream of gas containing in addition a larger quantity of radioactive noble gases comprising the sequential steps of:
   a. passing the stream of gas through an adsorbent filter of granular activated charcoal to trap radioactive iodine thereon;
   b. conveying the granular activated charcoal to a purging region;
   c. passing a purging gas through the granular activated charcoal to remove radioactive noble gases therefrom;
   d. conveying the granular activated charcoal to a radiation detector; and
   e. detecting the radiation emanating from the granular activated charcoal,
which detected radiation is a measure of the quantity of radioactive iodine in the stream of gas.

5. An apparatus for continuously monitoring the concentration of radioactive iodine in a stream of test gas comprising:
   a. a conveyor for conveying granular adsorbent filter material;
   b. a quantity of granular adsorbent filter material in the conveyor;
   c. means connected to the conveyor for moving the filter material downstream through the conveyor;
   d. a first inlet for test gas connected to the conveyor;
   e. means for passing the stream of test gas through the first inlet and into and through a portion of the filter material;
   f. a second inlet for purging gas connected to the conveyor at a location downstream of the first inlet;
   g. means for passing a purging gas through the second inlet and into and through a portion of the filter material after the stream of test gas is passed therethrough;
   h. a detector of radioactivity disposed near the conveyor downstream of the second inlet and operatively coupled to the filter material after the purging gas is passed therethrough to measure radioactivity of materials adsorbed on the filter material.

6. The apparatus of claim 5 wherein the granular adsorbent filter material is activated charcoal.

7. The apparatus of claim 6 wherein the means for moving the filter material comprise a worm drive.

8. The apparatus of claim 5 wherein the detector of radioactivity comprises:
   a. a scintillator;
   b. a photomultiplier optically coupled to the scintillator and responsive thereto to generate electrical signals;
   c. a counter connected to the photomultiplier;
   d. display means connected to the counter for displaying the count of detected radioactivity.

* * * * *